United States Patent

[11] 3,579,043

[72] Inventor Charles P. Goeller
  Quincy, Mass.
[21] Appl. No. 776,127
[22] Filed Nov. 15, 1968
[45] Patented May 18, 1971
[73] Assignee Allis-Chalmers Manufacturing Company
  Milwaukee, Wis.

[54] REVERSE POWER RELAY
  2 Claims, 1 Drawing Fig.
[52] U.S. Cl. ........................................ 317/36,
  317/39, 317/43
[51] Int. Cl. ........................................ H02h 3/38
[50] Field of Search ............................. 317/36, 39,
  43, 33

[56] References Cited
  UNITED STATES PATENTS
  3,396,310 8/1969 Logan .................... 317/43X
  3,278,804 10/1966 Lensner et al. .......... 317/39

3,325,687 6/1967 Ungrad ........................ 317/36
*Primary Examiner*—William M. Shoop, Jr.
*Assistant Examiner*—Harry E. Moose, Jr.
*Attorneys*—Thomas F. Kirby, Robert B. Benson and Lee H. Kaiser

ABSTRACT: A reverse power relay using semiconductor components is provided to sense the phase relationship between current and voltage in an electric circuit and to trip a circuit breaker controlling that circuit in the event of reverse power conditions. The reverse power relay comprises an amplifier and current multivibrator circuit, an amplifier and potential multivibrator circuit, a comparator circuit, and a timing and output circuit. Current and voltage condition signals from the two multivibrator circuit are compared in the comparator circuit and, if a reverse power condition exists, an output signal from the timing and output circuit operates a trip coil which trips the circuit breaker. The reverse power relay is powered from the same power supply as a known type of overcurrent trip device.

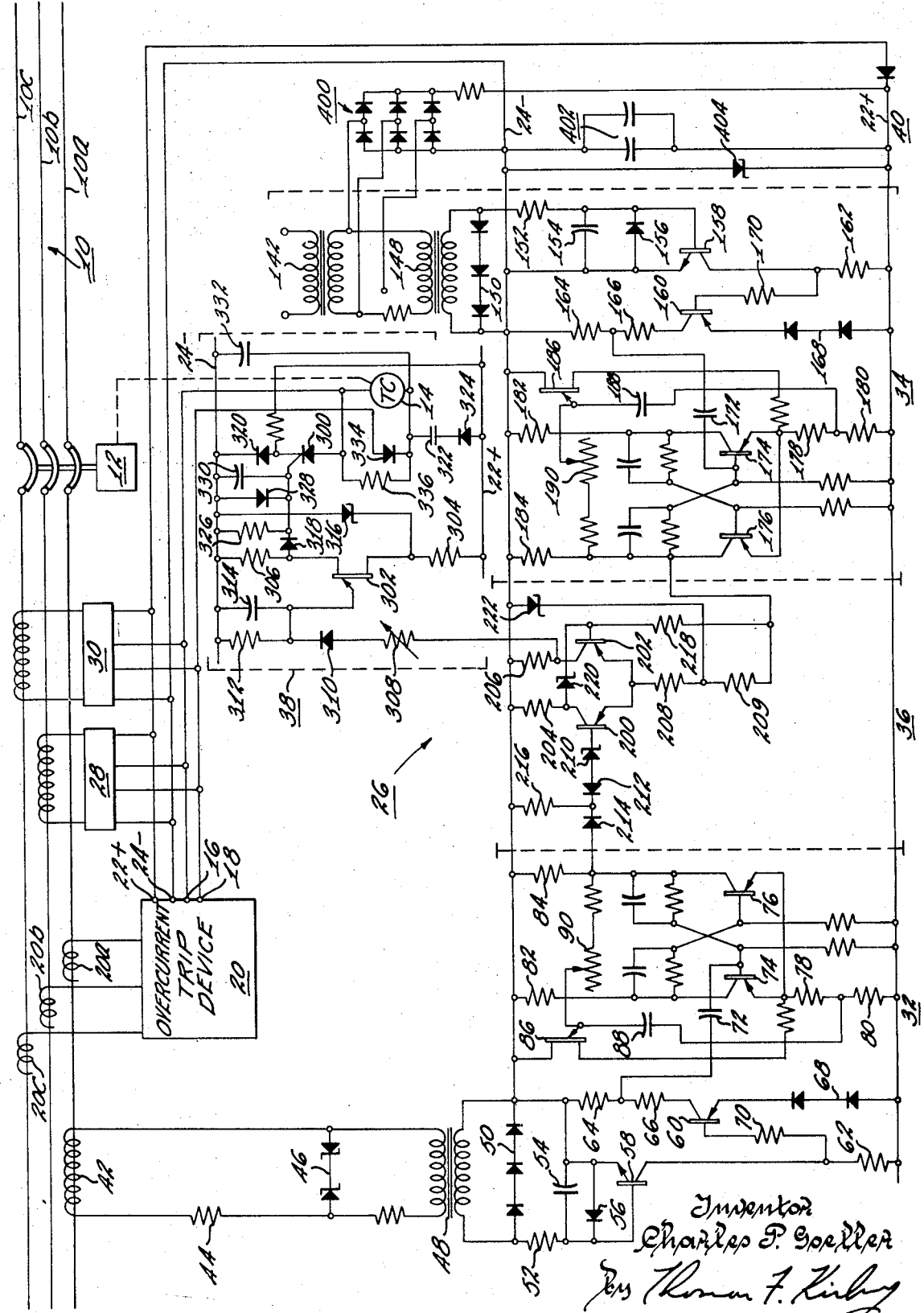

REVERSE POWER RELAY

SUMMARY

This invention relates to reverse power relays which use semiconductor components.

Reverse power relays sense the phase relationship between current and voltage in electrical circuits and trip a circuit breaker controlling that circuit when reverse power conditions occur. Electromechanical type reverse power relays are effected by shock, vibration and wear and require frequent servicing. Furthermore, electrochemical relays are rather large physically and cannot be used where space is at a premium. It is desirable, therefore, to provide improved reverse power relays which use semiconductor and static components to overcome the aforesaid disadvantages of electrochemical relays.

A reverse power relay in accordance with the present invention contemplates a multiphase electrical circuit which is controlled by a circuit breaker having a trip coil and comprises means for detecting line current, means for detecting line potential, a comparator circuit for comparing the output signals of the aforesaid means, and a timing and output circuit for operating the trip coil when reverse power occurs to open the circuit breaker.

OBJECTS

It is an object of the present invention to provide improved reverse power relays.

Another object is to provide reverse power relays of the aforesaid character which are compact, which employ semiconductor and static components instead of electromechanical components, and which are shock and vibration proof.

Another object is to provide reverse power relays of the aforesaid character which use pulses of adjustable width in their comparison circuit to produce an output which covers a wide angular range.

Another object is to provide reverse power relays of the aforesaid character which can operate over a temperature range of −40° C. to +100° C. and is not affected by airborne dirt.

Other objects and advantages of the invention will hereinafter appear.

DRAWINGS

The accompanying drawing illustrates a preferred embodiment of the invention, but it is to be understood that the embodiment illustrated is susceptible of modifications with respect to details thereof without departing from the scope of the appended claims.

In the drawing, the single FIGURE shows a schematic diagram of a reverse power relay in accordance with the present invention associated with a multiphase electrical circuit which is controlled by a circuit breaker and an overcurrent trip device.

DESCRIPTION

Referring to the drawing, the numeral 10 designates a multiphase electrical circuit having three lines 10a, 10b and 10c which are controlled by a multipole circuit breaker 12 (shown closed). Circuit breaker 12 is adapted to be tripped open in response to energization of a trip coil 14 and the latter is adapted to be energized either from the trip signal output terminals 16 and 18 on overcurrent trip device 20 or by a reverse power relay in accordance with the present invention and hereinafter described in detail. Overcurrent trip device 20 is coupled to lines 10a, 10b and 10c of electrical circuit 10 by suitable transformers 20a, 20b and 20c, respectively, which provide overcurrent trip device 20 with electrical power for its own operation and with intelligence information about fault current conditions in the lines. Overcurrent trip device 20 is also provided with electrical power output terminals 22 and 24 (positive and negative, respectively) from which the reverse power relay is powered.

The reverse power relay in accordance with the invention comprises as many stages as there are lines in the electrical circuit 10 which is being controlled. Thus, stage 26 which is shown in detail is associated with line 10a and stages 28 and 30 are associated with lines 10b and 10c, respectively. Each stage operates the same trip coil 14. Stages 28 and 30 are understood to be identical to stage 26, therefore, only the latter will hereinafter be described in detail.

Stage 26 of the reverse power relay may be considered for purposes of discussion to comprise five interrelated circuits, namely: an amplifier and current multivibrator circuit 32; an amplifier and potential multivibrator circuit 34; a comparator circuit 36; a timing and output circuit 38; and a power supply circuit 40.

Means are provided in stage 26 of the reverse power relay to sense current conditions in line 10a of electrical circuit 10 and to provide a signal to amplifier and current multivibrator circuit 32 in response thereto. Such means comprise a current transformer having a secondary winding 42 which is coupled to line 10a and saturates at very low line currents so as to minimize the energy therein at short circuit current levels. Secondary winding 42 is shunted by a resistor 44 and a pair of Zener diodes 46 which cooperate to dissipate the energy available from the secondary at high current levels. The diodes 46 also provide a clipped low level voltage at higher current levels which excite a transformer 48 which has its primary winding connected to secondary winding 42 of the current transformer. Transformer 48 is a square loop core transformer designed to produce a sharp narrow pulse near current zero at its secondary. A diode string 50 is connected across the secondary winding of transformer 48 to clip the voltage therefrom so as to provide a pulse signal having a substantially rectangular waveform. A filter circuit comprising a resistor 52 and a capacitor 54 is also connected across the secondary winding of transformer 48 and a diode 56 is connected across capacitor 54.

Circuit 32 comprises an amplifier which is connected to the secondary of transformer 48. The amplifier comprises transistors 58 and 60. Specifically, the emitter-collector circuit of transistor 58 is connected across power terminals 22 and 24 in series with a resistor 62 and the base of transistor 58 is connected to the secondary of transformer 48. A signal from transformer 48 turns on transistor 58. The emitter-collector circuit of transistor 60 is connected across power terminals 22 and 24 in series with resistors 64 and 66 and a diode string 68 which provides temperature compensation. The base of transistor 60 is connected through a resistor 70 to the collector of transistor 58. Thus, when transistor 58 is on, a path is provided for base-emitter current for transistor 60 through diode string 68, through the base-emitter junction of transistor 60, through resistor 70, and through the collector-emitter junction of transistor 58 to negative power terminal 24. When transistor 60 turns on, a pulse appears across the collector resistors 64 and 66 which is applied through a coupling capacitor 72 to a multivibrator of circuit 32 which comprises two transistors 74 and 76.

In the multivibrator of circuit 32, the emitter-collector circuit of transistor 74 is connected across power terminals 22 and 24 in series with resistors 78 and 80 and with a resistor 82. The emitter-collector circuit of transistor 76 is connected across power terminals 22 and 24 in series with the resistors 78 and 80 and with a resistor 84. The base of transistor 74 is connected to coupling capacitor 72. The bases of a unijunction transistor 86 are connected across power terminals 22 and 24 in series with the resistors 78 and 80 and the emitter electrode thereof is connected through a capacitor 88 to a point between those resistors and to a potentiometer 90.

The pulse from the amplifier of circuit 32 through capacitor 72 is applied to the base of transistor 74 to turn off the latter. Capacitor 88 which is initially charged to the voltage of positive power terminal 22 starts to discharge through resistor 78, through transistor 76, and through potentiometer 90. As capacitor 88 discharges, the emitter electrode of unijunction transistor 86 rises in potential with respect to negative power terminal 24 until the peak point emitter voltage of unijunction transistor 86 is reached. Transistor 86 then fires and capacitor 88 charges through resistor 80 and the emitter-base path of transistor 86 to power terminal 24. The pulse through resistor 80 turns off transistor 76 and transistor 74 turns on. The length of time that transistor 76 remains on (and thus the pulse width) can be varied by adjusting potentiometer 90. The sequence then continues as follows. The pulse from capacitor 72 to the base of transistor 74 turns off transistor 74 and turns on transistor 76. Thus, a pulse of rectangular shape is produced across resistor 84 which is the current output pulse for use in comparator circuit 36, hereinafter described. Pulses continue to be generated as long as current flow exists in line 10a.

Means are also provided in stage 26 of the reverse power relay to sense voltage or potential conditions in line 10a of electrical circuit 10 and to provide a potential signal to amplifier and potential multivibrator circuit 34. Such means comprise a potential transformer 142 which is understood to be suitably connected to line 10a. Circuit 34 is substantially identical to amplifier and current multivibrator circuit 32. Potential transformer 142 excites a transformer 148 which has its primary winding connected to the secondary winding of potential transformer 142. Transformer 148 is a square loop core transformer designed to produce a sharp narrow pulse at its secondary. A diode string 150 is connected across the secondary winding of transformer 148 to clip the voltage therefrom so as to provide a pulse signal having a substantially rectangular waveform. A filter circuit comprising a resistor 152 and a capacitor 154 is also connected across the secondary winding of transformer 148 and a biasing diode 156 is connected across capacitor 154.

Circuit 34 comprises an amplifier which is connected to the secondary of transformer 148. The amplifier comprises transistors 158 and 160. The emitter-collector circuit of transistor 158 is connected across power supply terminals 22 and 24 in series with a resistor 162 and the base of transistor 158 is connected to the secondary of transformer 148. A signal from transformer 148 turns on transistor 158. The emitter-collector circuit of transistor 160 is connected across power supply terminals 22 and 24 in series with resistors 164 and 166 and a diode string 168 which provides temperature compensation. The base of transistor 160 is connected through a resistor 170 to the collector of transistor 158. Thus, when transistor 158 is on, a path is provided for base-emitter current for transistor 160 through diode string 168, through the base-emitter junction of transistor 160, through resistor 170, and through the collector-emitter junction of transistor 158 to negative power terminal 24. When transistor 160 turns on, a pulse appears across the collector resistors 164 and 166 which is applied through a coupling capacitor 172 to a multivibrator of circuit 34 which comprises two transistors 174 and 176.

In the multivibrator of circuit 34, the emitter-collector circuit of transistor 174 is connected across power terminals 22 and 24 in series with resistors 178 and 180 and with a resistor 182. The emitter-collector circuit of transistor 176 is connected across power terminals 22 and 24 in series with the resistors 178 and 180 and with a resistor 184. The base of transistor 174 is connected to coupling capacitor 172. The bases of a unijunction transistor 186 are connected across power terminals 22 and 24 in series with the resistors 178 and 180 and the emitter electrode thereof is connected through a capacitor 188 to a point between those resistors and to a potentiometer 190.

The pulse from the amplifier of circuit 34 through capacitor 172 is applied to the base of transistor 174 to turn off the latter. Capacitor 188 which is initially charged to the voltage of positive power terminal 22 starts to discharge through resistor 178, through transistor 176, and through potentiometer 190. As capacitor 188 discharges, the emitter electrode of unijunction transistor 186 rises in potential with respect to negative power terminal 24 until the peak point emitter voltage of unijunction transistor 186 is reached. Transistor 186 then fires and capacitor 188 charges through resistor 180 and the emitter-base path of transistor 186 to power terminal 24. The pulse through resistor 180 turns off transistor 176 and transistor 174 turns on. The length of time that transistor 176 remains on (and thus the pulse width) can be varied by adjusting potentiometer 190. The sequence then continues as follows. The pulse from capacitor 172 to the base of transistor 174 turns off transistor 174 and turns on transistor 176. Thus, a pulse of rectangular shape is produced across resistor 184 which is the voltage or potential output pulse for use in comparator circuit 36, hereinafter described. Pulses continue to be generated as long as a potential exists in line 10a.

Means in the form of comparator circuit 36 are provided in stage 26 of the reverse power relay to compare the current signal of pulses from circuit 32 and the voltage signal or pulses from circuit 34 and to provide an output signal (also in the form of a pulse) when the current and voltage pulses overlap which indicates whether or not a reverse power condition exists, which output signal is supplied to timing the output circuit 38. Comparator circuit 36 comprises a Schmitt trigger which has two transistors 200 and 202. The emitter-collector circuits of the transistors 200 and 202 are connected on one side to power terminal 24 through collector resistors 204 and 206, respectively, and the other sides are connected to the series connected resistors 208 and 209. The base of transistor 200 is connected through a Zener diode 210 and through a pair of steering diodes 212 and 214 to current output signal resistor 84. A resistor 216 is connected to power terminal 24 and to a point between the diodes 212 and 214. The base of transistor 202 is connected through a resistor 218 to potential output signal resistor 184 and through a Zener diode 220 to resistor 204. Zener diode 220 is understood to have a higher breakdown voltage than Zener diode 210. A Zener diode 222 is connected between power terminal 24 and a point between resistors 208 and 209.

When an output signal from circuit 34 appears across resistor 184, transistor 200 turns on because there is a base-current path for transistor 200 through resistors 208 and 209, through the base-emitter junction of transistor 200, through Zener diode 210, through diode 212, and through resistor 216 to power terminal 24. Thus, voltage appears across collector resistor 204. When voltage appears simultaneously across current output signal resistor 84 of circuit 32, current flows through diode 214 to increase the potential across resistor 216. Diode 212 becomes reverse biased and the base current of transistor 200 turns off. Transistor 202 now turns on since there is a base current path therefor through resistors 208 and 209, through the base-emitter junction of transistor 202, through Zener diode 220 and through resistor 204. An output then appears across collector resistor 206.

The relative polarities of current transformer 42 and potential transformer 142 are chosen so that in the forward direction of power flow in line 10a of circuit 10, the pulses presented to comparator circuit 36 from the transformer do not overlap and, normally no output signal is produced by the comparator circuit. However, when current (power) reversal occurs, the pulses will overlap in comparator circuit 36 and the comparator circuit will produce an output signal.

Means in the form of timing and output circuit 38 are provided in stage 26 of the reverse power relay to receive the output signal from comparator circuit 36 and to effect, after a delay of about 50 milliseconds, firing of a controlled rectifier 300 and energization of trip coil 14 to trip circuit breaker 12. Timing and output circuit 38 comprises a unijunction transistor 302 which has its base legs connected across power terminals 22 and 24 in series with resistors 304 and 306, respectively. Collector or output resistor 206 of comparator circuit 36 is connected to the emitter electrode of transistor 302 through a rheostat 308 and a diode 310. A time delay means in the form of a timing resistor 312 and a timing capacitor 314 in parallel therewith is connected between power terminal 24 and the emitter electrode of transistor 302. One base leg of transistor 302 is connected through a Zener diode 316 to power terminal 24 and the other base leg is connected through a diode 318 to the gate of controlled rectifier 300 which is connected across power terminals 22 and 24 in series with a diode 320, trip coil 14, an auxiliary switch 322, and a diode 324. A resistor 326, a diode 328 and a capacitor 330 are connected in parallel with each other between power terminal 24 and the gate of controlled rectifier 300. A decoupling capacitor 332 is connected across power terminals 22 and 24. Diode 334 is used to isolate the output of the reverse power relay from the output of the overcurrent trip device 20. Similarly, diode 324 is used to isolate the output of the overcurrent trip device 20 from the output of the reverse power relay. Resistor 336 provides holding current for controlled rectifier 300 and for this reason is connected in parallel with trip coil 14.

In operation, an output signal from resistor 206 of comparator 36 is applied through rheostat 308 and diode 310 to effect charging of timing capacitor 314. When the voltage in 314 is fully charged, it triggers unijunction transistor 302 and a trip signal flows through diode 318 to the gate of controlled rectifier 300, causing the latter to fire and thereby effecting energization of trip coil 14 and tripping of circuit breaker 12. Switch 322 is one stage of the circuit breaker auxiliary switch and is mechanically operated by connection to the circuit breaker mechanism. Specifically, it is a switch which is closed when the circuit breaker is closed and open when the breaker is open.

As hereinbefore explained, operating power for the reverse current relay including stages 26, 28, 30 and trip coil 14 is normally supplied from power supply terminals 22 and 24 from three phase diode bridge 400. However, it is desirable to provide an alternative power supply available for such purposes in the event of a fault condition occuring in electric circuit 10 which causes circuit voltage to drop substantially as a result of high current levels in current 10. Accordingly, there is provided connections to the overcurrent trip devices 22 and 24 to supply operating potential from the overcurrent device whose supply is derived from the line current in circuit 10. Suitable capacitors 402 are connected across the terminals 22 and 24 and are adapted to be charged from bridge 400. A Zener diode 404 for voltage regulation is connected in parallel with the capacitors 402.

The embodiments of the invention in which an exclusive property or privilege is claimed are defined as follows:

I claim:

1. In a solid-state reverse power relay for controlling the trip coil of an electric circuit breaker in a multiphase electrical power circuit:

first means for sensing current conditions in said power circuit and for providing a first output signal related thereto, second means for sensing potential conditions in said power circuit and for providing a second output signal related thereto, third means for comparing said first and second output signals and for providing a third output signal in the event power reversal occurs in said power circuit, fourth means for effecting operation of said trip coil after a predetermined delay in response to occurrence of said third output signal, first power supply means for operating said relay and for energizing said trip coil in response to said fourth means, and second power supply means, including capacitor means adapted to be charged by said first power supply means, for operating said relay and for energizing said trip coil in response to said fourth means in the event said first power supply means is inoperative.

2. In a system comprising a multiphase electrical circuit, a circuit breaker for controlling said circuit in response to operation of a trip coil, and an overcurrent trip device for effecting operation of said trip coil, said overcurrent trip device also providing a normal source of operating power from said circuit for itself and for said trip coil: a solid-state reverse power relay for effecting operation of said trip coil in the event of reverse power conditions in said circuit, said reverse power relay receiving its operating power from said overcurrent trip device and comprising:

first means comprising a multivibrator circuit for sensing current conditions in said power circuit and for providing a first output signal related thereto, second means comprising a multivibrator circuit for sensing potential conditions in said power circuit and for providing a second output signal related thereto, third means comprising a Schmitt trigger circuit for comparing said first and second output signals and for providing a third output signal in the event power reversal occurs in said power circuit, fourth means comprising a controlled rectifier for effecting operation of said trip coil after a predetermined delay in response to occurrence of said third output signal, and emergency power supply means for energizing the reverse power relay and the trip coil in the event said normal power supply means is inoperative, said emergency power supply means including capacitor means adapted to be charged by the operating power from said overcurrent trip device.